US006339729B1

(12) United States Patent
Dreyer et al.

(10) Patent No.: US 6,339,729 B1
(45) Date of Patent: Jan. 15, 2002

(54) PROCESS AND REGULATION DEVICE FOR RING FURNACES

(75) Inventors: Christian Dreyer, Saint-Jean de Maurienne; Patrick Claudel, Bernin, both of (FR)

(73) Assignee: Aluminium Pechiney, Puteaux (FR)

( * ) Notice: Subject to any disclaimer, the term of this patent is extended or adjusted under 35 U.S.C. 154(b) by 0 days.

(21) Appl. No.: 09/271,880

(22) Filed: Mar. 18, 1999

(30) Foreign Application Priority Data

Apr. 3, 1998 (FR) ........................................... 98 04404

(51) Int. Cl.[7] ............................................... G06F 19/00
(52) U.S. Cl. ......................................... 700/209; 432/47
(58) Field of Search ................................ 700/209, 210, 700/274; 432/192, 49, 47, 19, 249; 373/74, 75, 77

(56) References Cited

U.S. PATENT DOCUMENTS 4,284,404 A * 8/1981 Genevois et al. ............. 432/37
4,354,828 A * 10/1982 Benton et al. ................ 432/24
4,445,918 A * 5/1984 Modone et al. ............... 65/379
4,552,530 A * 11/1985 Gunnes et al. .............. 432/192
4,738,706 A * 4/1988 Picinelli .................... 65/29.21
4,744,749 A * 5/1988 Dreyer et al. ............... 432/121
4,859,175 A * 8/1989 Dryer et al. ................... 432/4
5,013,336 A * 5/1991 Kempf et al. ................. 95/275
5,609,815 A * 3/1997 Bauer ......................... 264/414

* cited by examiner

*Primary Examiner*—William Grant
*Assistant Examiner*—Zoila Cabrera
(74) *Attorney, Agent, or Firm*—Dennison, Scheiner & Schultz

(57) ABSTRACT

A process for regulating a furnace which includes a sequence of sections, cooling sections, baking sections, and preheating sections, in which the preheating sections at the tail are fitted with exhaust pipes for combustion gases, and in the transverse direction with a series of flue walls and pits in which blocks containing carbon to be baked are stacked, in which gas streams circulate through the flue walls. The mass flow in each of the streams of combustion exhaust gases is regulated by measuring this flow and the temperature in order to obtain a predetermined set value of energy flux.

19 Claims, 6 Drawing Sheets

Cg = f(Tg) pour Tg = Tj
Ej = DGj.Cg(Tj-Ta)
Ej = Eoj?
DC4j = DCo4j
DC5j = DCo5j
DC6j = DCo6j
Pj = Poj ± Po
5

Pa

PROCESS AND REGULATION DEVICE FOR RING FURNACES

DOMAIN OF THE INVENTION

The invention relates to the domain of ring furnaces for baking blocks containing carbon and more particularly a process and a device for regulation of these furnaces.

STATE OF THE ART

Regulation methods for this type of furnace are already known, for example as described in French applications FR 2 600 152 and FR 2 614 093 submitted by the Applicant, and in international application WO 91/19147.

This type of furnace, also called an "open section" furnace comprises several preheating, baking and cooling sections in the longitudinal direction (as described in the referenced documents), the composition of each section in the transverse direction consisting of flue walls through which combustion gases circulate alternating with pits in which blocks containing carbon to be baked are stacked, the blocks being immersed in dust containing carbon.

This type of furnace comprises two bays whose total length may exceed a hundred meters. Each bay comprises a series of sections separated by head walls and open in their upper part, through which unbaked blocks are loaded and cooled baked blocks are unloaded. Each section includes a set of thin flue walls parallel to the longitudinal direction of the furnace, in other words its major axis, through which the hot gases or combustion exhaust gases which provide the heat for baking will circulate, alternating in the transverse direction of the furnace with pits in which the blocks to be baked are stacked.

Closable openings called "peep holes" are placed in the upper part of the flue walls. They are also provided with baffles to extend and more uniformly distribute the trajectory of combustion gases or exhaust gases.

The furnace is heated by burner ramps, the length of which is equal to the width of the sections, the injectors for these burners being inserted through peep holes in the flue walls of the sections concerned. On the upstream side of the burners (upstream considering the direction in which combustion is advancing), combustion air blowing openings are placed on an air blowing ramp equipped with fans, these blowing openings being connected to the said flue walls through the peep holes. On the downstream side of the burners, combustion exhaust gas openings are installed on an exhaust ramp supplying the exhaust gas collection centers equipped with dampers which close off the said exhaust openings to the required level. Heating is applied by combustion of the fuel injected in the baking sections, and by combustion of tar vapor released from the blocks during baking in the preheating sections, which due to the negative pressure in the preheating sections, leaves the pits by passing through the flue wall and burns with the oxygen remaining in the combustion exhaust gases circulating in the flue walls in these sections.

Typically, there are about ten sections "active" at the same time; four in the cooling area, three in the heating area and three in the preheating area.

As baking continues, the "blowing openings—burners—exhaust openings" assembly will be moved forward by one section, for example every 24 hours, the sequence of operations in each section consisting of loading an unbaked block containing carbon in front of the preheating zone, then natural preheating in the preheating zone due to combustion exhaust gases and combustion of tar vapors, then heating the blocks to 1100–1200° C. in the baking zone, and finally cooling the blocks by cold air in the cooling zone at the same time as preheating combustion air for the furnace, the cooling zone being followed by a zone in which the cooled blocks containing carbon are unloaded.

The most frequently used method of regulation for this type of furnace is to regulate the temperature and/or pressure in a number of sections in the furnace. Typically, out of the ten sections that are active at any one time, four will be provided with temperature measurements and two will be provided with pressure measurements. Firstly, the three burner ramps are regulated as a function of the temperature of the combustion exhaust gases, the fuel injection being adjusted to follow a temperature rise curve (typically the temperature of the combustion exhaust gases but possibly the temperature of the blocks containing carbon). Secondly, the fan speed on the air blowing ramp is typically regulated as a function of a static pressure measured on the upstream side of the burners, but it may also be kept constant. Finally, the exhaust gas dampers are regulated as a function of a negative pressure measured in a section located between the burners and the exhaust openings. But more frequently (particularly in more recent furnaces) the said negative pressure is itself controlled by a set temperature, which is typically the temperature of combustion exhaust gases such that the said dampers are controlled by a temperature measurement and its comparison with a set temperature.

The furnace may also be regulated by other complementary means:

- French application FR 2 600 152 also describes a device for optimizing combustion in the baking area in order to measure the opacity of exhaust gases in the exhaust openings and to regulate this exhaust correspondingly;
- French application FR 2 614 093 also describes a method of optimizing combustion in the furnace by continuously injecting the necessary and sufficient air quantity to obtain complete combustion of volatile materials released during baking of the blocks containing carbon and the fuel injected in the burners;
- application WO 91/19147 also describes a check on the oxygen/fuel ratio in the furnace by measuring the oxygen content in the furnace.

PROBLEM THAT ARISES

Regulation methods used in the past are based mainly on temperature measurements and pressure measurements in a large number of sections, and in the various flue walls in the same section. As indicated in the mentioned state of prior art, these basic measurements may be complemented by other measurements.

Furthermore, temperature and pressure set values are known for each section, and must be respected so that the quality of the resulting blocks containing carbon is satisfactory and to ensure that the furnace operates correctly, particularly in the preheating area. Volatile materials contained in the tar escape while the blocks containing carbon to be baked are being preheated. It is important that these gases or vapors are drawn in towards the flue walls and burn immediately in the presence of the residual oxygen present in combustion exhaust gases. Otherwise, these tar vapors could form a deposit on the openings, the exhaust ramp and pipes leading to the collection system. These deposits can ignite on contact with incandescent particles of carbon dust. These fires damage flues and their hot exhaust gases burn the filters and fans in collection centers. Considering these risks, safety margins are adopted by increasing the flows of drawn in combustion exhaust gases, which in turn cause excess fuel consumption and reduce the energy performances of the furnace.

Furthermore, it is observed that current regulation of furnaces results in instabilities and generates sudden random variations in the flows of drawn in combustion exhaust gases and fuel flows, such that heat transfer conditions in the furnace are not stable, which has an adverse effect on the efficiency of the heat exchange or heat transfer between the combustion exhaust gases and the said blocks containing carbon.

Finally, this dispersion of the various flows leads to a dispersion in baking levels which makes it necessary to overbake some of the blocks containing carbon or anodes to guarantee the minimum quality in all anodes, which automatically reduces the energy performances of the furnace.

Finally, the current methods used for furnace operation and regulation are characterized firstly by a considerable increase in the number of measurement sensors, and secondly by adoption of large safety margins for each of the main three parameters used to operate the furnace; blowing air on the upstream side of cooling sections, fuel injection in baking sections, and drawing in combustion exhaust gases on the downstream side of the preheating sections.

The results of this state of affairs are that:

- firstly, the complete set of measurement and regulation means form a non-negligible part of the investment and operating costs of the furnace, since many of the sensors have a short life due to the particularly severe temperature and environmental conditions, and consequently can be considered as being consumables,
- secondly, since these measurement and regulation means are incapable of stabilizing furnace operation, the result is that energy consumption is variable and the average consumption is significantly greater than the optimum considering safety margins taken to guarantee the quality of the blocks containing carbon made and to guarantee the integrity and durability of the furnace.

This invention is intended to solve these two problems and to operate the furnace automatically and optimally while reducing the investment cost and the operating cost of control and regulation equipment, and the energy consumption of the furnace.

DESCRIPTION OF THE INVENTION

A first object of the invention is a process for regulating a ring furnace for baking blocks containing carbon, and including a sequence of sections $C_i$ that are active simultaneously but in a different manner, namely working along the longitudinal direction from upstream to downstream, cooling sections the first of which at the head is supplied with atmospheric air through blowing openings $S_j$, baking sections equipped with at least one burner ramp with injectors $I_j$ supplied with fuel, and preheating sections the last of which at the tail is equipped with combustion exhaust gas openings $A_j$, and in the transverse direction comprising a sequence of flue walls $Cl_{ij}$ alternating with pits $Al_{ij}$ in which blocks containing carbon to be baked are stacked, the said flue walls $Cl_{ij}$ in a given section $C_i$ being fitted with peep holes through which the said blowing openings $S_j$ and/or the said injectors $I_j$ and/or the said exhaust openings $A_j$ and/or measurement means communicating with flue walls $Cl_{i-1j}$ and $Cl_{i+1j}$ in the previous section $C_{i-1}$ and the next section Ci+1 will be fitted, to control circulation of a gaseous stream from the upstream side towards the downstream side, the gas including atmospheric air and/or combustion exhaust gases, characterized in that the mass flow $DG_j$ of each of the combustion exhaust gas streams $G_j$ passing through the said exhaust openings $A_j$ at the tail of the preheating sections, is regulated by measuring the mass flow $DG_j$ and the temperature $T_j$ of each of the combustion exhaust gas streams $G_j$, by calculating the corresponding energy fluxes $E_j$, typically by calculating the product R equal to $DG_j.(T_j-T_a)\,C_g$. where $T_j$ and $T_a$ are the temperature of the combustion exhaust gases $G_j$ and the ambient air respectively, and $C_g$ is the specific heat of combustion exhaust gases at temperature $T_j$, so as to maintain the said energy flux $E_j$ equal to a predetermined set value $Eo_j$ for each of the combustion exhaust gas streams $G_j$.

This set value $Eo_j$ may either be a predetermined constant, or a predetermined function of time f(t). Typically, mobile furnace equipment (burner ramps, blowing openings ramp, exhaust openings ramp, etc.) is moved forward by one section every 24 hours. Therefore, set values which depend on time are defined over this period T, as may be the case for $Eo_j$. During the time T in which combustion is taking place on a given section, it may be useful to have a set value $Eo_j$ which includes either one ramp, in other words a regular variation of the set value $Eo_j$ during the residence time, or particular set values at the beginning or end of the residence time T.

Therefore, the essential aspect of the invention is the fact that the energy flux $E_j$ in the combustion exhaust gases drawn in by each exhaust opening $A_j$ is determined in order to control furnace actuators, whereas in prior art the exhaust openings and the burners were controlled as a function of a temperature curve which itself usually depends on time during the period T.

The energy flux $E_j$ in each stream of combustion exhaust gases is actually an enthalpy flux for which a good approximation can be obtained using the value of R equal to $(DG_j.(T_j-T_a)$. A more precise value may be obtained by replacing "$(T_j-T_a)$. Cg" by the value of the integral $\int C_g(T).\,dT$ for T between $T_a$ and $T_j$, or by any approximate polynomial expression for this integral.

Surprisingly, the applicant found that this means which is an essential part of the invention, solves the problem that arises, even though it is much simpler than control means used in the state of the art. The applicant was able to verify in particular that this means enabled:

- stable operation of the furnace, instead of operation with sudden parameter variations,
- economic operation, concerning fuel consumption,
- simplification of control and regulation equipment and devices.

Globally, the result is the manufacture of blocks containing carbon baked with a more constant quality and at lower cost. The reasons for which the means according to the invention gives these surprising results have not been clearly defined. However, according to one hypothesis made by the applicant, external air streams that penetrate at negative pressure into preheating sections of a furnace with open sections, could interfere with operation of the furnace and cause a disturbing element that accentuates variations in furnace parameters.

Based on this hypothesis, the applicant had the idea of using a regulation parameter independent of the variable added quantity of external air. To do this, he found that a parameter such as the parameter R, equivalent to an energy flux with respect to ambient temperature, was completely independent of the variable quantity of air that entered into the furnace and consequently could enable effective regulation of the furnace with stable and economic furnace operation.

According to the invention, the said set value denoted $Eo_j$ of energy fluxes $E_j$ in combustion exhaust gases $G_j$ is chosen, usually experimentally, to be the lowest possible value compatible with standard quality requirements for manufactured blocks containing carbon and furnace operation.

According to the invention, there is no need to regulate all energy fluxes $E_j$, but a limited number may be regulated, for example every second flux. In this case, flux $E_k$ which is not regulated is considered to be equal to the average of the values of the adjacent regulated fluxes $E_{k-1}$ and $E_{k+1}$.

DESCRIPTION OF THE FIGURES

FIG. 1 is a top view of the "active" part of a ring furnace (1) according to the invention. FIG. 1a corresponds to FIG. 1 and shows a sectional view through the furnace (1) in the vertical plane and along the longitudinal direction, and particularly the sequence of flue walls from $Cl_{1j}$ to $Cl_{10j}$ through which the various gas streams circulate. FIG. 1b is a curve showing the air pressure (34) and/or the combustion exhaust gases pressure (35) in the various flue walls.

FIG. 2 shows a partially exploded perspective view of a furnace (1) comprising means according to the invention.

FIG. 3 shows a longitudinal section through a flow sensor according to the invention. FIG. 3a shows a variant of the invention in which the temperature $T_j$ is measured in the exhaust opening (210), preferably on the downstream side of the flow sensor (214).

FIG. 4 is a sectional view in the X-Z plane of a flue wall (3) in a section $C_i$ (2) according to the state of the art through which gas streams (34, 35) circulate. Each section $C_i$ comprises baffles (31) that extend the path of gas streams (34, 35) and is separated from the previous section $C_{i-1}$ and the next section $C_{i+1}$ by a head wall (32). The flue wall (3) comprises peep holes or orifices (30) fitted with covers (36) adjacent to which there is a shaft (39), in other words a vertical space in which there is no baffle (31) or tie brick (33), so that mobile devices necessary for operation of the furnace, and particularly the exhaust openings (210) and the blowing openings (230) can be lowered into the flue wall.

FIG. 5 is a sectional view in the X-Y plane through a preheating section $C_i$ according to the state of the art, showing the alternation of flue walls (3) and pits (4). Each pit (4) is filled with blocks containing carbon to be baked (40) covered with a powder containing carbon (42), each pit $Al_{ij}$ (4) being heated by two adjacent flue walls $Cl_{ij}$ and $Cl_{ij+1}$. Tar vapors (41) released due to heating of the blocks containing carbon spread into the flue walls (3) at a negative pressure and ignite in the presence of oxygen remaining in the combustion exhaust gases (35) or in the air stream (38).

FIG. 6 shows a graph containing a number of points, each point corresponding to an experimental measurement made by the applicant on furnaces regulated according to prior art. The graph shows the energy consumed Ec (fuel) in MJ per tonne of manufactured blocks containing carbon as the ordinate, whereas the abscissa shows the energy Eg dissipated in combustion exhaust gases in MJ per tonne manufactured.

FIG. 7 shows a diagrammatic representation of regulation according to the invention.

DETAILED DESCRIPTION OF THE INVENTION

Figure 6:
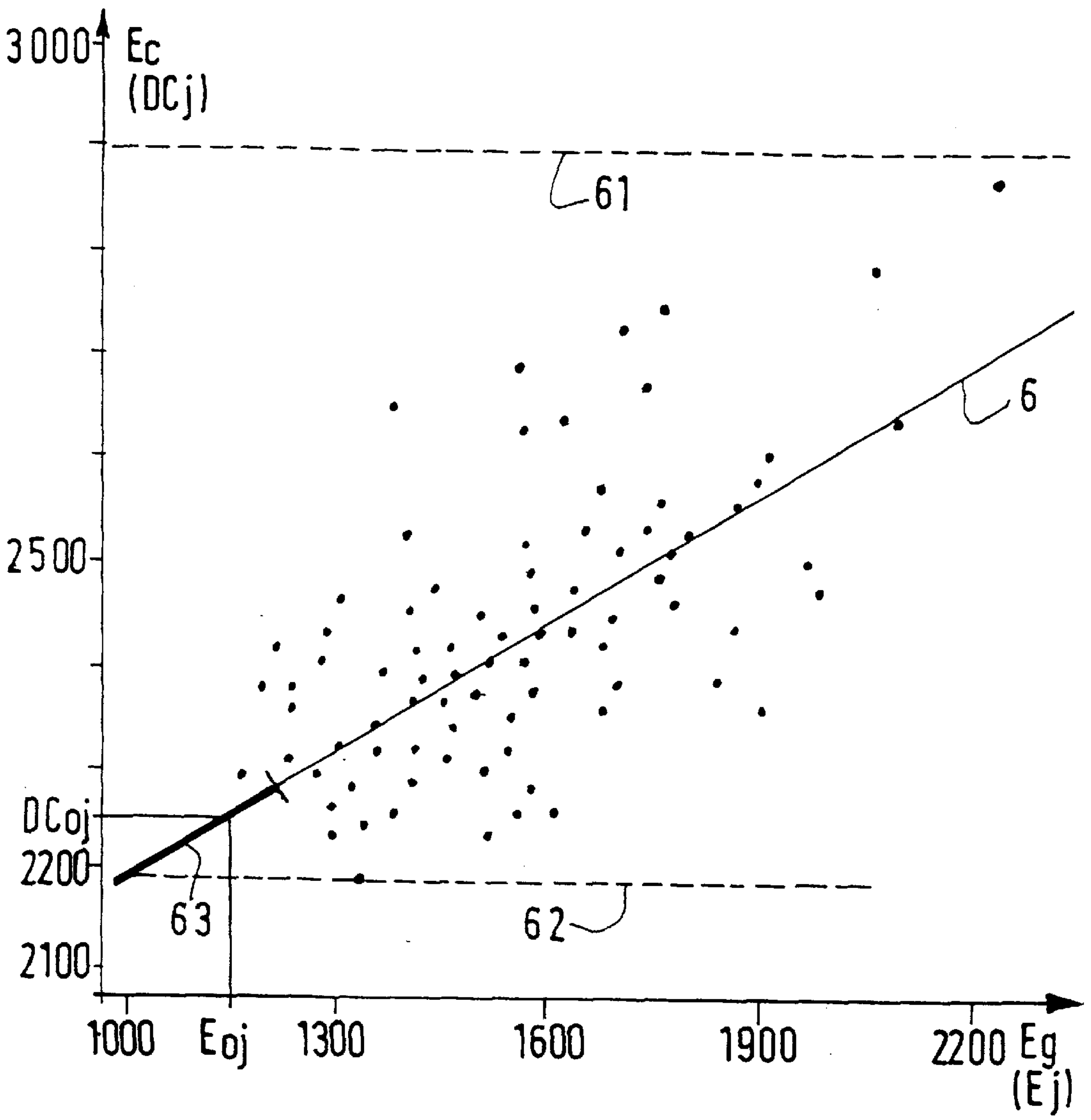

The invention is based on the applicant's concept of studying the operation of furnaces regulated according to prior art, by comparing consumed energy and lost energy as shown on the graph in FIG. 6. This graph shows that the consumed energy varies a great deal between the end straight lines (61,62), from 2200 to 2900 MJ/t. The applicant observed a strong correlation between the values of Ec and Eg, which is represented by a regression straight line (6).

With the regulation process according to the invention, it is chosen to operate the furnace with the lowest possible predetermined value of Eg as determined experimentally, and with a value of Ec equal to or close to the value correlated to the value Eg on the portion (63) of the regression straight line (6).

Proportional values of Eo-DCo (the dimensions of which are in energy per unit time) correspond to values of Eg−Ec expressed in MJ/t, such that once the set values Eo for the global energy of combustion exhaust gases or $Eo_j$ for the energy of the combustion exhaust gases at each exhaust opening $A_j$ have been determined experimentally, the portion of the regression straight line (63) can be used to determine the corresponding set value for fuel flows DCo for all burners, or flows $DCo_j$ or $DCo_{ij}$ corresponding to flue walls $Cl_j$ or $Cl_{ij}$ depending on whether there are one or several burner ramps.

Figures 1, 1A, 1B, 1C:
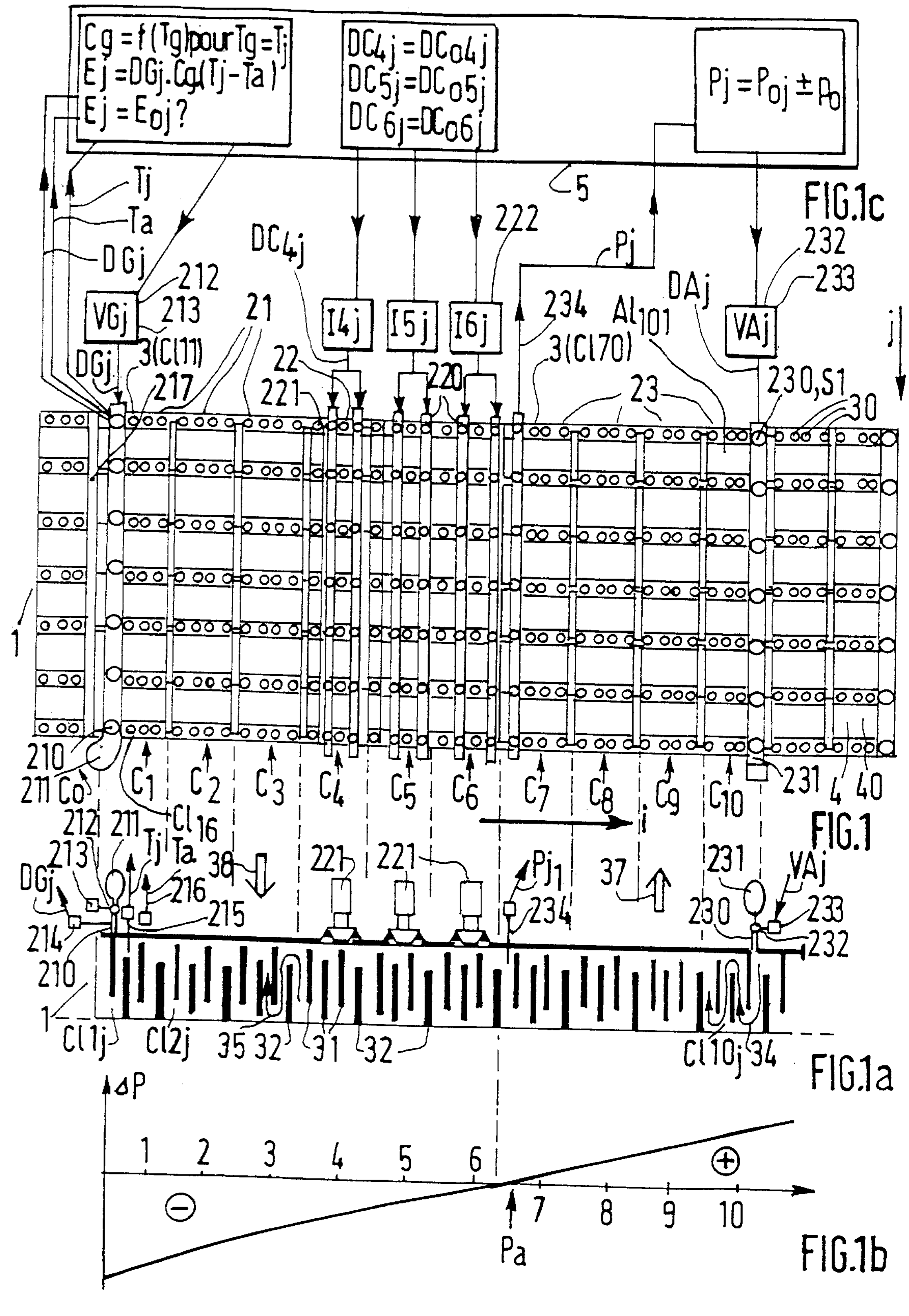
FIGS. 1, 1a, 1b, 2, 3, 3a, 6 and 7 related to the invention are described in the example according to the invention or in the description.
FIG. 1c diagrammatically shows the computer control and regulation means (5) associated with the previous figures.
Figure 7:
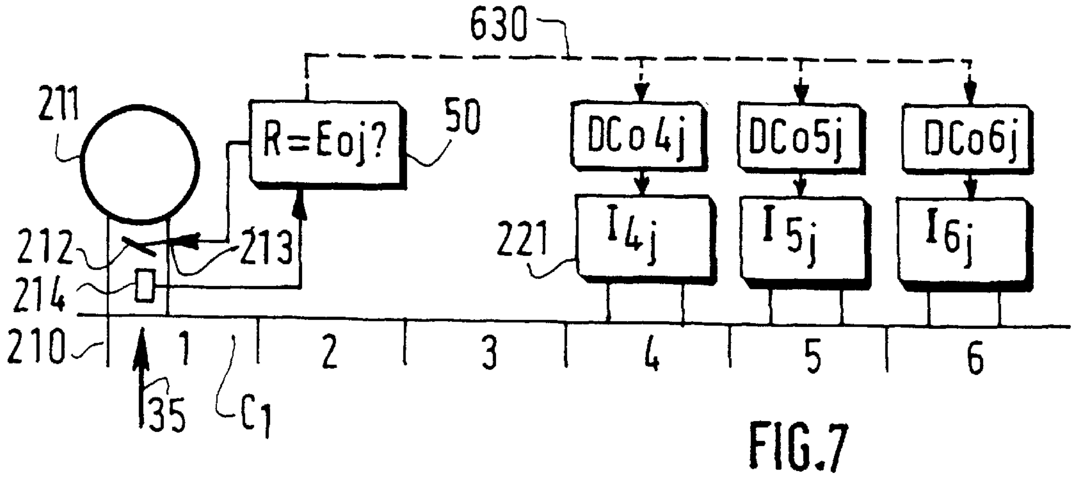

Therefore preferably, the fuel flow $DC_j$ supplying the said burners $I_j$ is fixed at a predetermined level $DCo_j$ as illustrated in FIGS. 1 and 1c and FIG. 7.

Thus, the invention does not require a measurement of the temperature of combustion exhaust gases for regulation of the fuel flow $DC_j$, bearing in mind that this fuel flow (which is usually distributed between several burner ramps, typically three or four burner ramps, placed in successive sections from $C_i$ to $C_{i+2}$ or to $C_{i+3}$) is fixed at a predetermined value $DCo_j$ which may be a function of time determined particularly during furnace start up tests, and as a function of the energy level $Eo_j$ as already mentioned with reference to FIGS. 6 and 7, this set value $DCo_j$ being correlated with the predetermined level of the said product R corresponding to the energy fluxes Eo or $Eo_j$ in the combustion exhaust gases, according to portion (63) of the experimental regression straight line in FIG. 6.

This method is contrary to all knowledge in prior art, in which the fuel flow is typically and traditionally regulated by the temperature of combustion gases in baking sections.

However, the predetermined level of the fuel flow $DCo_j$ may be chosen for a given flue wall $Cl_{ij}$ (3) in a given baking section $C_i$ (22) of a given furnace, such that the value of the measured temperature of the combustion exhaust gases (35) in the flue wall $Cl_{ij}$ (3) is equal to a predetermined value, typically between 1000° and 1300°.

Of course, it should be checked that the required temperatures in each of the sections are actually reached during the furnace start up phase or the furnace restart phase, but this is not the same as regulation of a furnace operating under routine conditions.

Within the framework of the invention, the said air flow $DA_j$ through the said blowing openings $S_j$ (230) at the head of the cooling sections (23) may be regulated, either such that the pressure in the flue walls $Cl_{ij}$ of the said baking sections $C_i$ (22) is less than the atmospheric pressure and is within a predetermined pressure range, the static pressure $P_j$ at the tail of the cooling sections (23) being approximately equal to atmospheric pressure, or such that the speed of air stream (34), or the speed of the fan blowing this air stream at the entry to the said baking sections, is constant and is equal to a predetermined value as illustrated in FIGS. 1, 1*a*, 1*b* and 1*c*.

But according to the invention, the air flow $DA_j$ is preferably fixed at a predetermined value such that the static pressure at the head of the baking sections (22) is less than atmospheric pressure. In this case, the pressure measurement $P_j$ may possibly be used to verify that there is no drift in the process, at regular time intervals, for example once every day or once every week.

According to the invention, set values and particularly Eo corresponding to the energy flux in combustion exhaust gases drawn out of the furnace, and the corresponding value of DCo corresponding to fuel consumption in the burners, are defined for each section $Cl_{ij}$ in the furnace, and are identified along the transverse direction of the furnace by the subscript "j", and along the longitudinal direction of the furnace by the subscript "i", so as to obtain a map of set values that takes account of boundary effects both at the sides of the said furnace and at its ends due to combustion movements. In order to obtain constant quality of manufactured products at the lowest possible cost, it is beneficial to take account of boundary effects, in other words to define optimum set values for each partition $Cl_{ij}$ as a function of the subscripts "i" and "j" which can be done once and for all when the furnace is being started up, and corrections to these set values can then be made during the life of the furnace, for example to take account of aging of materials and possible changes to the gas tightness of the furnace. The set value $DCo_j$ may be corrected during baking to keep it at an optimum value. In particular, it has been found beneficial to correct $DCo_j$ using a measurement of the carbon monoxide content in the exhaust gases at the exit from the furnace. This can be done by measuring the carbon monoxide content in the exhaust ramp or at the inlet to the exhaust gases treatment center.

Preferably, computer means (5,50) known in themselves may be used to store set values or ranges of the said set values of the various parameters for each flue wall $Cl_{ij}$ in the entire furnace, and particularly $Eo_{ij}$, to compare these values with measured values of these parameters, possibly after calculation, in combination with actuators controlled by the said computer means to correct the said regulation parameters if necessary, particularly by modifying the air flow $DA_{ij}$ such that measured values become equal to set values, or are within the ranges of set values.

Another object of the invention is a furnace regulation device to implement the regulation process according to the invention, the device including:

- means of measuring flows $DG_j$ of streams of combustion exhaust gases $G_j$,
- computer means (5,50) for storing set values or ranges of set values of energy fluxes $Eo_j$, to compare these values after calculating the value of R particularly as a function of the flow $DG_j$ and the temperature $T_j$ of the combustion exhaust gases, with measured values of the energy flux $E_j$,
- and actuators (213) controlled by the said computer means, to correct the value of the measured energy flux Ej if necessary by modifying the flow $DG_j$ of the stream of combustion exhaust gases, such that the measured values $E_j$ are equal to the set values $Eo_j$ or are within the set value ranges.

This device may also include storage of the correlation function (63) between set values of energy fluxes Eo or $Eo_j$ and set values of fuel flows DCo or $DCo_j$ and the corresponding regulation of the said flows starting from any variation of Eo or $Eo_j$.

It may also include computer means (5) for storing set values or ranges of set values of the pressure $Po_j$ and comparing this value with the measured value of the pressure $P_j$ and actuators controlled by the said computer means to correct the said regulation parameters if necessary by modifying the air flow $DA_j$, to make measured values equal to the set values or within the set value ranges. But as mentioned above, the air flows $DA_j$ are preferably kept at a predetermined constant value.

It was found that it is beneficial to use a Venturi tube (214) placed in each of the said exhaust openings $A_j$ (210) to measure flows $DG_j$ of combustion gases $G_j$. Preferably, the Venturi tubes used will be small, so that they can be placed inside the said exhaust openings $A_j$ and will only collect a determined fraction of the gas stream $G_j$, typically $1/5^{th}$ to $1/20^{th}$ of this stream, because the applicant has observed that the use of these tubes has many advantages compared with the use of a Venturi tube through which the entire gas stream passes, namely low cost, low pressure loss, not much dirt accumulation, compactness, and particularly accurate flow measurement.

In the device according to the invention, the air flows $DA_j$ and the flows $DG_j$ of combustion exhaust gases (35) drawn in may be varied by adjusting dampers denoted $VA_j$ (232) and $VG_j$ (212) respectively, and placed on each of the blowing openings $S_j$ (230) connected to an air blowing ramp (231), and on each of the exhaust openings $A_j$ (210) connected to an exhaust ramp (211), respectively.

EXAMPLE EMBODIMENT

The invention is illustrated in FIGS. 1, 1*a*, 1*b*, 1*c*, 2, 3, 3*a*, 6 and 7.

FIG. 1 according to the invention is a top view of the "active" part of a ring furnace (1), the "active" part comprising 10 sections $C_i$ along the longitudinal direction where i=1 to 10 with, from left to right, a sequence of 3 preheating sections (21) ($C_i$ to $C_3$), 3 baking sections (22) ($C_4$ to $C_6$) and 4 cooling sections (23) ($C_7$ to $C_{10}$), and in the transverse direction a sequence of flue walls $Cl_{ij}$ (3) alternating with pits $Al_{ij}$ (4) in which blocks containing carbon to be baked (40) are stacked, where i=1 to 10 and j=0 to 6 for $Cl_{ij}$ and 1 to 6 for $Al_{ij}$.

The flue walls $Cl_{ij}$ (3) are fitted with peep holes (30) through which the necessary mobile devices are inserted in the said flue walls, with from right to left, in other words from upstream to downstream along the direction of circulation of the gas streams (34,35):

- an air blowing ramp (231) placed transversely at the upstream end of the cooling section $C_{10}$, provided with air blowing openings $S_j$ (230), each air blowing opening $S_j$ blowing an air flow $DA_j$ regulated by means of a damper $VA_j$ (232) and an actuator (233) for this damper, into the corresponding heating flue wall $Cl_{10}$,
- three ramps of burners (220) placed transversely on baking sections $C_4$ to $C_6$, each ramp comprising two rows of burners (221) with fuel injectors $I_{ij}$ (222) where i=4 to 6 and j=0 to 6, each fuel injector $I_{ij}$ producing a fuel flow $DC_{ij}$,
- an exhaust ramp (211) placed transversely at the downstream end of the preheating section $C_1$, fitted with exhaust openings $A_j$ (210), each opening drawing in a stream of combustion exhaust gases $G_j$ in the said flue wall $Cl_{ij}$, with a mass flow of $DG_j$ that can be varied by means of a damper $VG_j$ (212) and an actuator (213) for this damper.

Figure 3:
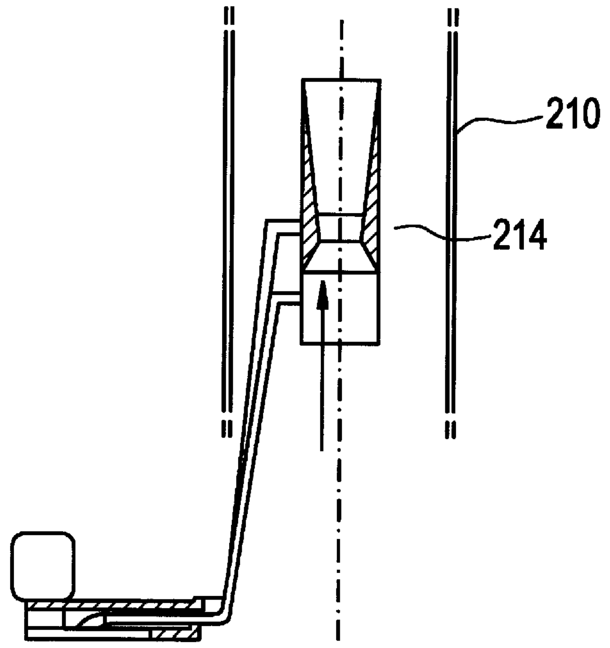
Figure 3A:
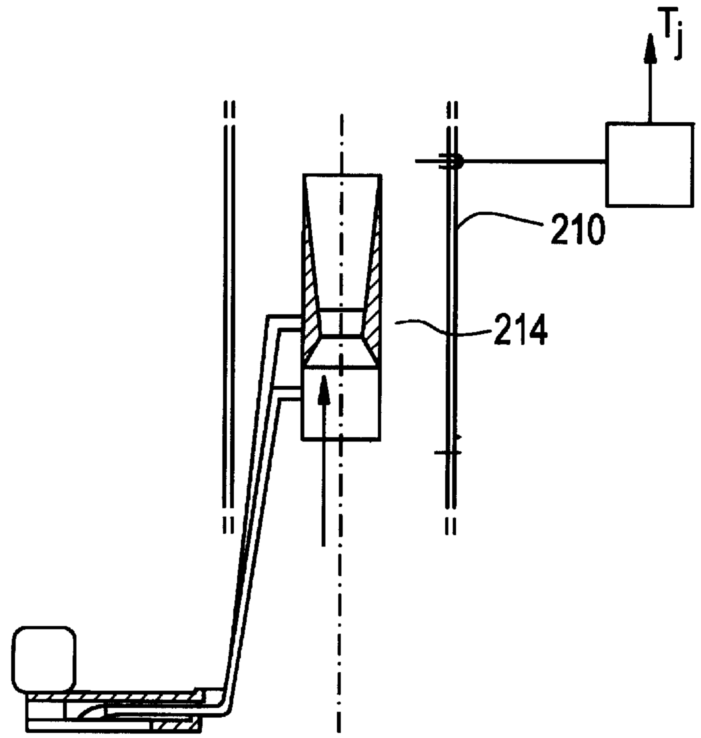
Figure 4:
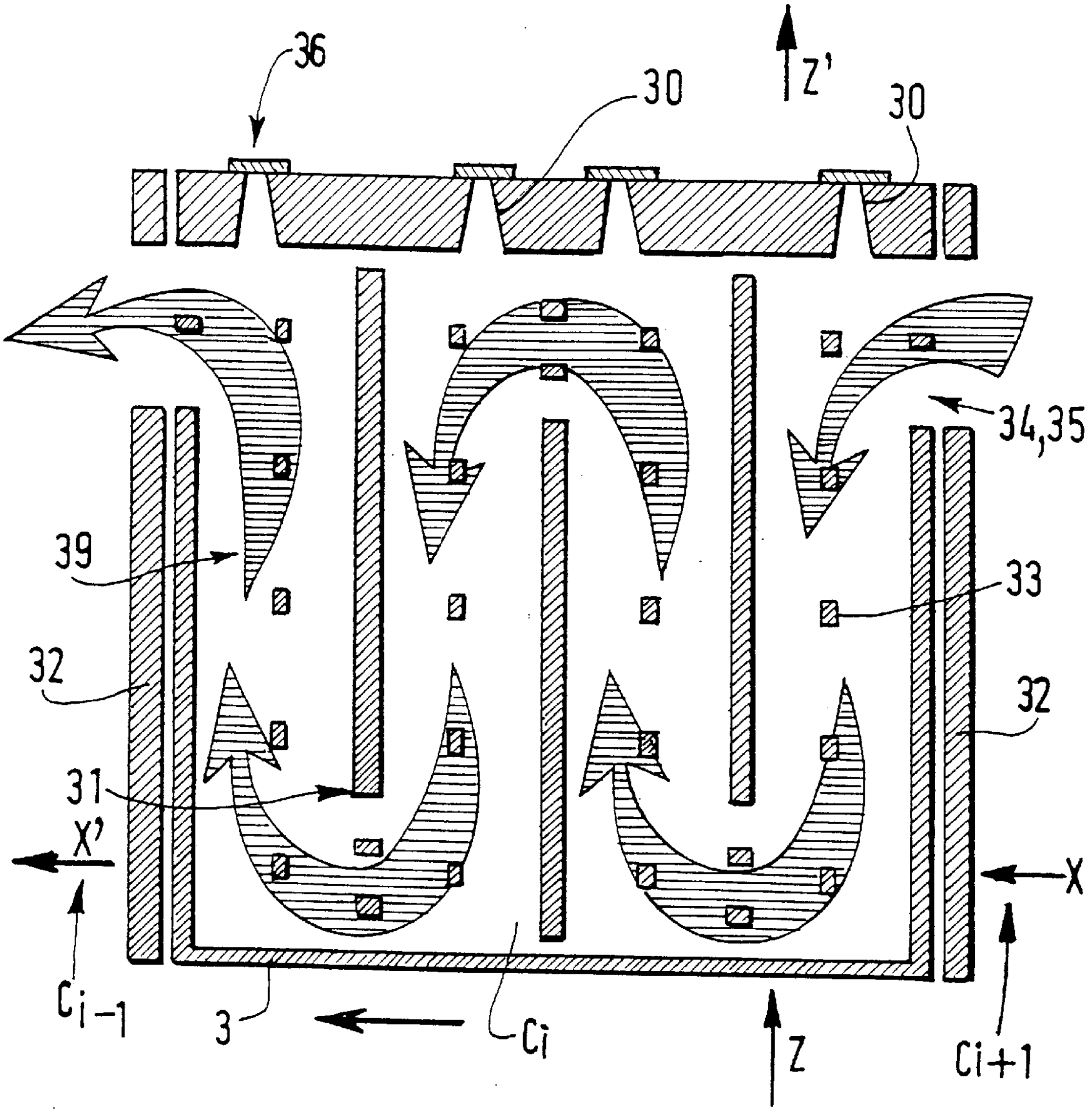
FIGS. 4 and 5 illustrate previously known elements of furnaces according to the invention.
Figure 5:
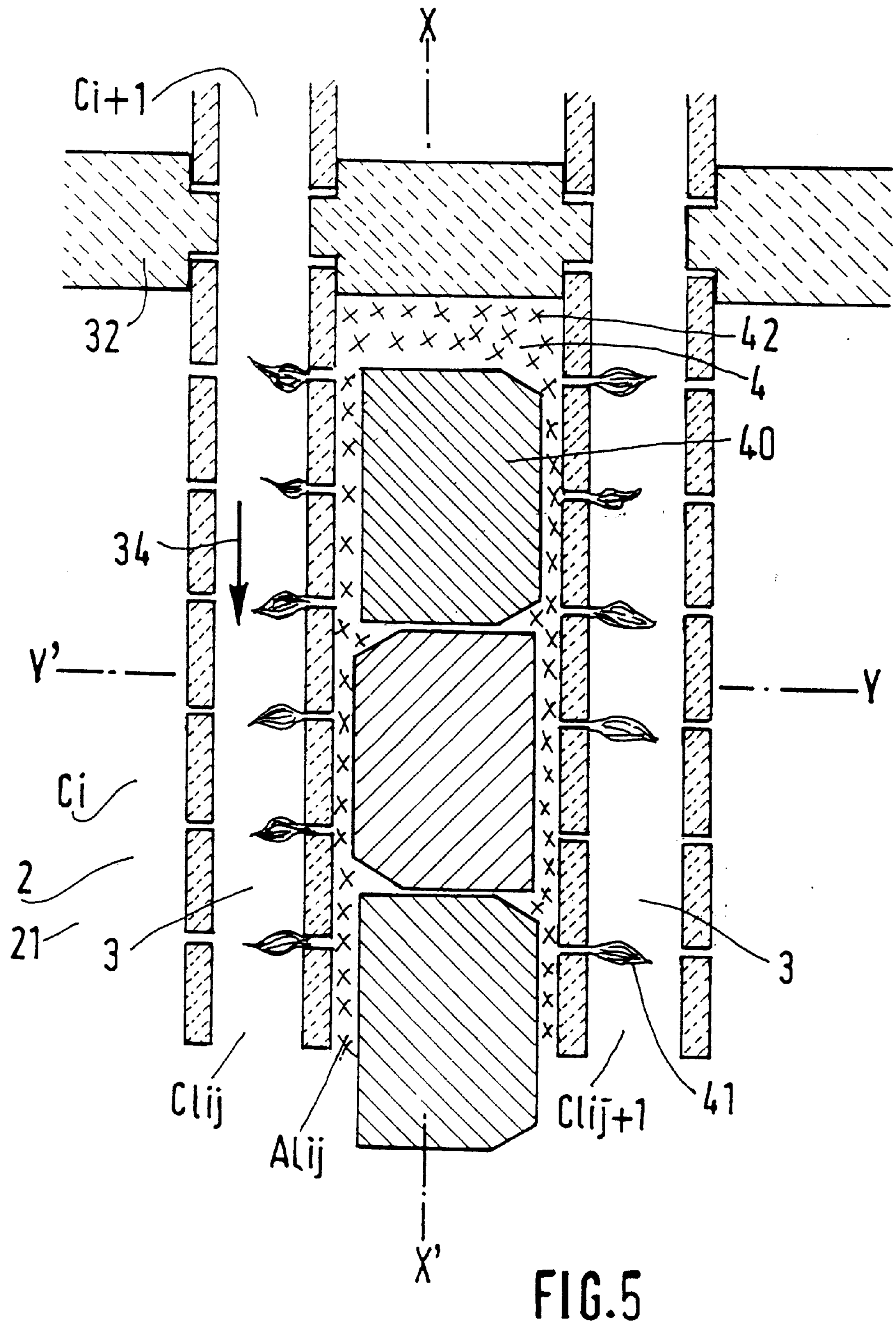

In order to achieve regulation according to the invention, each exhaust opening $A_j$ is provided with a "Venturi tube" type of measurement device (214) for measuring the mass flow $DG_j$ of the stream of combustion exhaust gases as described in FIGS. 3 and 3*a,* a device for measuring the temperature $T_j$ of this stream, and another device measuring the ambient air temperature Ta. These devices are not shown in FIG. 1. The said temperature measurement device comprises a gas temperature sensor (215) that measures the temperature $T_j$ of gases circulating in the exhaust openings $A_j$ (210), preferably on the downstream side of the mass flow measurement device (214). Typically, the temperature is measured by means of thermocouples.

An extendible dampers ramp (217) placed on section $C_0$, closes off flue walls $Cl_{ij}$ on the downstream side of the exhaust ramp (211) placed on section $C_1$, such that the stream of combustion exhaust gases is not diluted by an air stream from sections on the downstream side of combustion.

A pressure sensors ramp (234) is placed on section $C_7$ to measure the pressure $P_j$ and thus verify that the pressure in the first combustion section $C_6$ is actually slightly lower than atmospheric pressure.

FIG. 1*a* corresponds to FIG. 1 and shows a sectional view through the furnace (1) in the vertical plane and along the longitudinal direction, and particularly the sequence of flue walls from $Cl_{1j}$ to $Cl_{10j}$ through which circulate the various gaseous streams, air streams (34) in cooling sections $C_7$ to $C_{10}$, combustion exhaust gas streams (35) in combustion sections $C_4$ to $C_6$ and in preheating sections $C_1$ to $C_3$. Since sections $C_7$ to $C_{10}$ are pressurized, an air stream (37) escapes from these sections whereas an air stream (38) enters into sections $C_1$ to $C_6$ which are at a negative pressure as shown in FIG. 1*b*.

FIG. 1*b* shows the air pressure curve (34) or the combustion exhaust gases curve (35) in the various flue walls; section $C_7$ on the upstream side of the combustion sections is at atmospheric pressure Pa, whereas the pressure on the upstream side of section $C_{10}$ is equal to Pa+p where p=50 to 60 Pa, whereas the pressure on the downstream side of section $C_1$ is equal to Pa−p', where p'=100 to 200 Pa.

FIG. 1*c* diagrammatically shows computer control and regulation means (5) provided to:

on the upstream side, preferably, fix the air flow $DA_j$ blown into flue walls $Cl_{10j}$ at a constant value, or possibly regulate the air flow $DA_j$ by means of the damper $VA_j$ (232) and its actuator (233), such that the pressure $P_j$ measured just on the upstream side of the combustion sections is kept constant and within a set value range in the form $Po_j$+po, in the combustion sections, fix the fuel flows in the three injector ramps $I_{4j}$, $I_{5j}$ and $I_{6j}$, the flow $DC_{ij}$ through one injector $I_{ij}$ being equal to a set value $DCo_{ij}$, on the downstream side, regulate the streams of drawn in combustion exhaust gases (35) by measuring the values of each gas flow $DG_j$, its temperature $T_j$, the ambient temperature Ta by calculating the value of the product R, in other words the value of energy $E_j=DG_j \cdot C_g \cdot (T_j-Ta)$ contained in the stream $G_j$ of exhaust gases drawn in, and by regulating each flow $DG_j$ such that $E_j$ is equal to a set value $Eo_j$.

Figure 2:
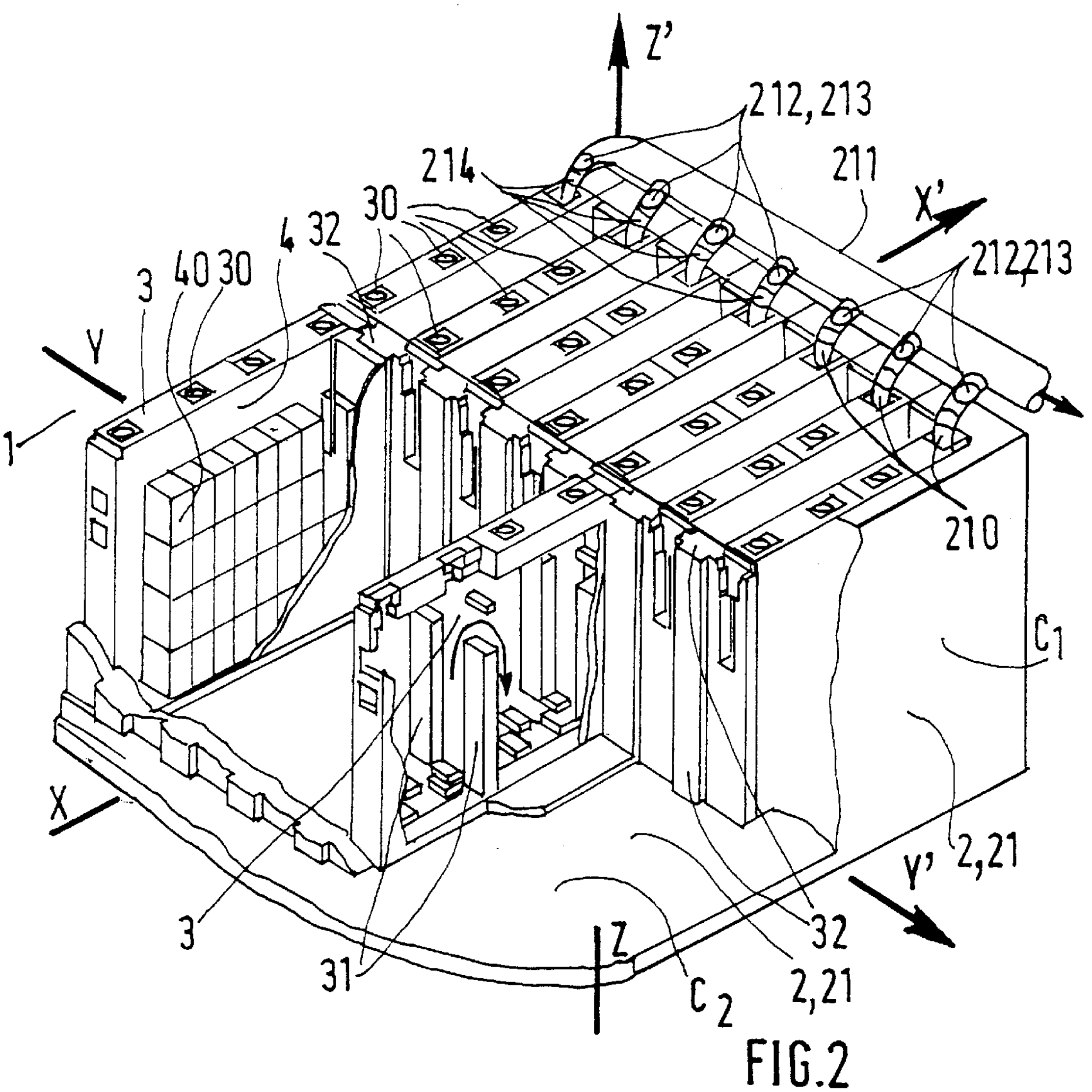

FIG. 2 shows a partially exploded perspective view of a furnace (1) according to the state of the art using means according to the invention. In particular, in the transverse direction denoted Y–Y', it shows a sequence of flue walls (3) fitted with peep holes (30) and baffles (31), and pits (4) containing stacks of blocks containing carbon (40) to be baked. Along the longitudinal direction denoted X–X', it shows a first section (section $C_2$) in exploded form and a second section (section $C_1$) equipped with exhaust openings (210) connected to an exhaust ramp (211), each opening comprising a flow sensor (214), a damper (212) and an actuator (213) for this damper.

FIGS. 3 and 3*a* show a longitudinal sectional view through a flow sensor according to the invention consisting of a "Venturi" type tube placed inside each exhaust opening $A_j$ (210) measuring a static pressure Ps and a differential pressure Pd, which can be used to calculate the mass flow $DG_j$. This flow is equal to $K.(Ps.Pd/T)^{1/2}$, where K is a constant taking account particularly of geometric factors, and only a fraction of the flow of combustion exhaust gases (35) passes into the Venturi tube.

FIG. 7 is a diagrammatic view of the regulation according to the invention; each exhaust opening (210) connected onto the exhaust ramp (211) comprises a Venturi type flow sensor (214), and a damper (212) controlled by an actuator (213). Regulation and control means (50) for flows $DG_j$ of combustion gases can be used, particularly making use of pressure measurements output by the flow sensor (214) to calculate the mass flow $DG_j$ of the stream of combustion exhaust gases (35), and then calculating the value of R, in other words the corresponding energy $E_j$ making use either of the necessary temperature measurements Ta and $T_j$, or other data input into memory, such as the specific heat of the exhaust gases $C_g$ as a function of their temperature and pressure, comparing it with a set value $Eo_j$ or a range of set values, and actuating the damper (212) so as to vary $DG_j$ in the required direction and thus correct the value of R or $E_j$.

FIG. 7 also shows the burners (221) with a predetermined flow DCo. A dashed line (630) connects the values of DCo or $DCo_j$ to the values of Eo or $Eo_j$, the relation between the two consisting of the correlation between Ec and Eg illustrated by the portion (63) of the regression straight line (6) in FIG. 6.

ADVANTAGES OF THE INVENTION

The invention has very important advantages, since it can:

firstly, simplify regulation of ring furnaces and thus reduce the investment or replacement cost of measurement devices, which can introduce considerable savings knowing that the regulation of a furnace represents about 10% of the total investment. With a regulation according to the invention in which in particular the burners are controlled by a power set value (energy flux Eo−$Eo_j$) rather than by a temperature as is the case according to current practice, thus saving 50 to 100 thermocouples per furnace, the life of the thermocouples being three months, secondly, reduce the energy consumption of furnaces by at least 10%, reducing it from an average of 2450 MJ/t to less than 2200 MJ/t, produce baked blocks containing carbon of constant quality, since there are no longer any sudden temperature variations in the furnaces, be adapted to existing furnaces and thus improve the operation of these furnaces without the need for a major investment.

What is claimed is:

1. Process for regulation of a ring furnace for baking blocks containing carbon, including a sequence of sections $C_i$ that are active simultaneously but in a different manner, along a longitudinal direction from upstream to downstream, cooling sections, the first of which at a head is supplied with atmospheric air through blowing openings $S_j$, baking sections equipped with at least one burner ramp with injectors $I_j$ supplied with fuel, and preheating sections, with a last preheating section at a tail equipped with exhaust openings $A_j$ through which combustion exhaust gases are drawn in, and in the transverse direction comprising a sequence of flue walls $Cl_{ij}$ alternating with pits $Al_{ij}$ in which blocks containing carbon to be baked are stacked, the flue walls $Cl_{ij}$ in a given section $C_i$ being fitted with orifices through which at least one of the blowing openings $S_j$, the injectors $I_j$, the exhaust openings $A_j$, and measurement means communicating with flue walls $Cl_{i-1j}$ and $Cl_{i+1j}$ in a previous section $C_{i-1}$ and a next section $C_{i+1}$ will be fitted, to control circulation of a gas stream from upstream side to downstream, the gas including atmospheric air, combustion exhaust gases or both, wherein a mass flow $DG_j$ for each combustion exhaust gas stream $G_j$ passing through exhaust openings $A_j$ at the tail of the preheating sections is regulated by measuring the mass flow $DG_j$ and temperature $T_j$ of each of the streams of combustion exhaust gas $G_j$, and by calculating a corresponding energy flux $E_j$, so as to maintain the said energy flux $E_j$ equal to a predetermined set value $Eo_j$ for each of the combustion exhaust gas streams $G_j$.

2. Process according to claim 1, wherein the energy fluxes $E_j$ are calculated as a product $R=DG_j.(T_j-T_a).C_g$, where $T_j$ and $T_a$ are the temperatures of the combustion exhaust gases $G_j$ and of the ambient air respectively, and $C_g$ is the specific heat of combustion exhaust gases at temperature $T_j$.

3. Process according to claim 1, wherein the set value $Eo_j$ is either a predetermined constant, or a predetermined function of time f(t).

4. Process according to claim 1, wherein fuel flow $DC_j$ into the burners $I_j$ is fixed at a predetermined level $DCo_j$.

5. Process according to claim 4, in which the predetermined level $DCo_j$ of the fuel flow $DC_j$ is determined from the set value $Eo_j$ and an experimental correlation curve between the energy flux $E_j$ and the fuel flow $DC_j$ into the burners.

6. Process according to claim 4, wherein the predetermined fuel flow is chosen for a given flue wall $Cl_{ij}$ in a given baking section $C_1$ in a given furnace, such that the measured temperature of the combustion exhaust gases in the flue wall $Cl_{ij}$ is a predetermined value.

7. Process according to claim 4, wherein set value $Dco_j$ is defined for each flue wall $Cl_{ij}$ in the furnace, both along a transverse direction of the furnace identified by subscript j, and along the longitudinal direction of the furnace identified by subscript i, in order to produce a map of set values that takes account of boundary effects both on the sides of the furnace and at ends thereof as combustion moves forwards.

8. Process according to claims 4, wherein $DCo_j$ is corrected during baking by means of measurements of carbon monoxide content in exhaust gases at the furnace outlet.

9. Process according to claim 1, wherein air flow $DA_j$ through the blowing openings $S_j$ at the head of the cooling sections is regulated, either such that the pressure in the said flue walls $Cl_{ij}$ in the baking sections $C_i$ is below atmospheric pressure and is within a predetermined pressure range, the static pressure $P_j$ at the tail of the cooling sections being approximately equal to atmospheric pressure, or such that the speed of the air stream or the speed of the fan used to apply movement to this air stream, at the inlet to the baking sections is constant and equal to a predetermined value.

10. Process according to claim 1, wherein air flow $DA_j$ through the blowing openings $S_j$ at the head of the cooling sections is fixed at a predetermined value such that the static pressure at the head of the baking sections is below atmospheric pressure.

11. Process according to claim 1, wherein the set value $Eo_j$, of the energy fluxes in the combustion exhaust gases $G_j$ is chosen to have the lowest possible value compatible with normal quality requirements for manufactured blocks containing carbon and operation of the furnace.

12. Process according to claim 1, wherein computer means are used to store set values or ranges of set values of parameters for each flue wall in the entire furnace and to compare the stored values with measured values of the parameters optionally after calculation, and actuators controlled by the computer means correct the parameters if necessary.

13. Process according to claim 1, wherein the temperature $T_j$ is measured in the exhaust openings $A_j$.

14. Process according to claim 1, wherein set value $Eo_j$ is defined for each flue wall $Cl_{ij}$ in the furnace, both along a transverse direction of the furnace identified by subscript j, and along the longitudinal direction of the furnace identified by subscript i, in order to produce a map of set values that takes account of boundary effects both on the sides of the furnace and at ends thereof as combustion moves forwards.

15. Furnace regulation device to implement a process for regulation of a ring furnace for baking blocks containing carbon, including a sequence of sections $C_i$ that are active simultaneously but in a different manner, along a longitudinal direction from upstream to downstream, cooling sections, the first of which at a head is supplied with atmospheric air through blowing openings $S_j$, baking sections equipped with at least one burner ramp with injectors $I_j$ supplied with fuel, and preheating sections, with a last preheating section at a tail equipped with exhaust openings $A_j$ through which combustion exhaust gases are drawn in, and in the transverse direction comprising a sequence of flue walls $Cl_{ij}$ alternating with pits $Al_{ij}$ in which blocks containing carbon to be baked are stacked, the flue walls $Cl_{ij}$ in a given section $C_1$ being fitted with orifices through which at least one of the blowing openings $S_j$, the injectors $I_j$, the exhaust openings $A_j$, and measurement means communicating with flue walls $Cl_{i-1j}$ and $Cl_{i+1j}$ in a previous section $C_{i-1}$ and a next section $C_{i+1}$ will be fitted, to control circulation of a gas stream from upstream side to downstream, the gas including atmospheric air, combustion exhaust gases or both, wherein a mass flow $DG_j$ for each combustion exhaust gas stream $G_j$ passing through exhaust openings $A_j$ at the tail of the preheating sections is regulated by measuring the mass flow $DG_j$ and temperature $T_j$ of each of the streams of combustion exhaust gas $G_j$, and by calculating a corresponding energy flux $E_j$, so as to maintain the said energy flux $E_j$ equal to a predetermined set value $Eo_j$ for each of the combustion exhaust gas streams $G_j$, said regulation device comprising:

means for measuring flows $DG_j$ of streams of combustion gases $G_j$, computer means for storing set value or ranges of set values of energy fluxes $Eo_j$, for comparing the set values of $Eo_j$ with the values of the measured energy flux $E_j$, and actuators controlled by the computer means, to correct the value of the measured energy flux $E_j$ if necessary by modifying the flow $DG_j$ of combustion exhaust gases $G_j$ such that measured values $E_j$ are equal to the set values $Eo_j$ or are within ranges of set values.

16. Device according to claim 15, further including means for storage of a correlation function between the set values of energy fluxes or $Eo_j$ and the corresponding set values of fuel flows $DCo_j$ and providing a corresponding regulation of the flows starting from any variation of Eo or $Eo_j$.

17. Regulation device according to claim 15, wherein the means for measuring the flows $DG_j$ of the stream of combustion exhaust gases $G_j$ comprises a Venturi tube placed in each of the exhaust openings $A_j$, so as to capture only a predetermined fraction of the gas flow $G_j$.

18. Regulation device according to claim 15, additionally comprising dampers, denoted $VA_j$ and $VG_j$ placed on each of the blowing openings $S_j$ connected to an air blowing ramp and onto each of the exhaust openings $A_j$ connected to an exhaust ramp, respectively, wherein the air flows $DA_j$ or the flows $DG_j$ of the stream of drawn in combustion exhaust gases are fixed or modulated by adjusting the dampers.

19. Regulation device according to claim 15, wherein a gas temperature sensor measures the temperature $T_j$ of gases circulating in the exhaust openings $A_j$.

* * * * *

UNITED STATES PATENT AND TRADEMARK OFFICE

CERTIFICATE OF CORRECTION

PATENT NO. : 6,339,729 B1
DATED : January 15, 2002
INVENTOR(S) : Christian Dreyer et al.

It is certified that error appears in the above-identified patent and that said Letters Patent is hereby corrected as shown below:

Column 3,
Line 66, change "Ci+1" to -- $C_{i+1}$ --.

Column 4,
Line 35, after "($T_j$-$T_a$)" insert -- .$C_g$) --;
Line 36, change "Cg" to -- $C_g$ --.

Column 9,
Line 49, change "$Po_j$+po" to -- $Po_j \pm Po$ --.

Column 12,
Line 37, change "$C_1$" to -- $C_i$ --.

Signed and Sealed this

Thirtieth Day of April, 2002

*Attest:*

JAMES E. ROGAN

*Attesting Officer* *Director of the United States Patent and Trademark Office*